(12) United States Patent
Lim et al.

(10) Patent No.: US 7,693,096 B2
(45) Date of Patent: Apr. 6, 2010

(54) METHOD AND SYSTEM FOR INDICATING DATA BURST ALLOCATION IN A WIRELESS COMMUNICATION SYSTEM

(75) Inventors: Geun-Hwi Lim, Seongnam-si (KR); Jun-Hyung Kim, Suwon-si (KR); Hong-Sung Chang, Suwon-si (KR); Yong Chang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1033 days.

(21) Appl. No.: 11/329,649

(22) Filed: Jan. 11, 2006

(65) Prior Publication Data

US 2006/0153112 A1     Jul. 13, 2006

(30) Foreign Application Priority Data

Jan. 11, 2005   (KR) ............... 10-2005-0002706
Jan. 22, 2005   (KR) ............... 10-2005-0006119

(51) Int. Cl.
*H04B 7/00*  (2006.01)

(52) U.S. Cl. .............. 370/310; 370/205; 370/208; 370/343; 370/319

(58) Field of Classification Search .............. 370/205, 370/208, 343, 319, 310
See application file for complete search history.

(56) References Cited

U.S. PATENT DOCUMENTS

| 6,687,547 B2 | 2/2004 | Goedeke et al. | |
| 6,728,365 B1 | 4/2004 | Li et al. | |
| 2002/0002050 A1 | 1/2002 | Rinne et al. | |
| 2003/0125051 A1 | 7/2003 | Leppisaari | |
| 2004/0022177 A1* | 2/2004 | Awad et al. | 370/204 |
| 2004/0190482 A1* | 9/2004 | Baum et al. | 370/347 |
| 2004/0219917 A1* | 11/2004 | Love et al. | 455/436 |
| 2005/0030914 A1 | 2/2005 | Binzel et al. | |
| 2006/0123324 A1* | 6/2006 | Cudak et al. | 714/776 |
| 2007/0286066 A1* | 12/2007 | Zhang et al. | 370/208 |

FOREIGN PATENT DOCUMENTS

JP     2003-078579     3/2003

(Continued)

OTHER PUBLICATIONS

Scalable OFDMA Physical Layer in IEEE 802.16 WirelessMAN, Intel Technology Journal, vol. 8, No. 3, Aug. 20, 2004, pp. 201-212.

(Continued)

*Primary Examiner*—Charles N Appiah
*Assistant Examiner*—Kwasi Karikari
(74) *Attorney, Agent, or Firm*—The Farrell Law Firm, LLP

(57) ABSTRACT

A method is provided for transmitting a MAP message in a wireless communication system. A base station transmits the MAP message including operation mode information indicating a data burst allocation scheme, to a mobile station. The mobile station identifies a data burst according to the operation mode information included in the MAP message received from the base station.

20 Claims, 5 Drawing Sheets

FOREIGN PATENT DOCUMENTS

| | | |
|---|---|---|
| KR | 1020000015682 | 3/2000 |
| KR | 1020050091581 | 9/2005 |
| KR | 1020050091593 | 9/2005 |
| KR | 1020050114165 | 12/2005 |
| RU | 2147796 | 4/2000 |
| WO | WO 95/28812 | 10/1995 |

OTHER PUBLICATIONS

Wonil Roh et al, An Efficient AMC Zone Configuration Within H-ARQ for MIMO OFDMA, IEEE 802.16 Broadband Wireless Access Working Group, Nov. 14, 2004.

Part 16: Air Interface for Fixed and Mobile Broadband Wireless Access Systems—Amendments for Physical and Medium Access Control Layers for Combined Fixed and Mobile Operation in Licensed Bands, IEEE P802.16e/D5a, Dec. 23, 2004.

* cited by examiner

METHOD AND SYSTEM FOR INDICATING DATA BURST ALLOCATION IN A WIRELESS COMMUNICATION SYSTEM

PRIORITY

This application claims the benefit under 35 U.S.C. §119 (a) to an application filed in the Korean Intellectual Property Office on Jan. 11, 2005 and assigned Serial No. 2005-2706, and to an application filed in the Korean Intellectual Property Office on Jan. 22, 2005 and assigned Serial No. 2005-6119, the contents of both of which are incorporated herein by reference.

BACKGROUND OF THE INVENTION

1. Field of the Invention

The present invention relates generally to a wireless communication system, and in particular, to a method and system for indicating uplink/downlink data burst allocation in a wireless communication system.

2. Description of the Related Art

Active research on the 4$^{th}$ Generation (4G) communication system, which is the next generation communication system, is being conducted to provide users with services guaranteeing various Qualities-of-Service (QoS) at a data rate of about 100 Mbps. In particular, active research on the 4G communication system is being carried out to support a high-speed service that guarantees mobility and QoS for Broadband Wireless Access (BWA) communication systems such as a wireless Local Area Network (LAN) system and a wireless Metropolitan Area Network (MAN) system. An Institute of Electrical and Electronics Engineers (IEEE) 802.16 communication system is a typical BWA communication system.

The IEEE 802.16 communication system is specified as a BWA communication system employing an Orthogonal Frequency Division Multiplexing (OFDM) scheme and/or an Orthogonal Frequency Division Multiple Access (OFDMA) scheme. Compared with the conventional wireless technology for a voice service, the IEEE 802.16 communication system can transmit more data for a short time because of its wide bandwidth for data, and allow all users to share channels, increasing channel efficiency. In the IEEE 802.16 communication system, because all users connected to a base station (BS) share common channels, and a period for which each user uses the channel is allocated thereto by the BS for every uplink/downlink frame, the BS must provide uplink/downlink access information every frame so that the users can share the channels. Messages used for providing the uplink/downlink access information are called uplink/downlink (UL/DL) MAP messages.

A Hybrid Automatic Repeat reQuest (H-ARQ) MAP message is one of the MAP messages. The H-ARQ MAP message is used for supporting a mobile station (MS) that can use an H-ARQ scheme. For example, upon receiving the H-ARQ MAP message from a BS, an MS analyzes the received H-ARQ MAP message. A MAP information element (IE) included in the H-ARQ MAP message is called a Compact UL/DL MAP IE, and the MS can receive/transmit data bursts according to information in the Compact UL/DL MAP IE.

FIG. 1 is a diagram illustrating a frame structure used in a conventional wireless communication system. Referring to FIG. 1, the frame can be divided into an uplink (UL) subframe region and a downlink (DL) subframe region. The DL subframe region includes a period in which a preamble is transmitted, a MAP period, and a burst period in which DL data bursts are allocated. The UL subframe region includes a UL control period and a burst period in which UL data bursts are allocated.

The UL/DL data bursts are sequentially allocated in units of subchannels on the vertical axis for a unit symbol period (i.e., 1-symbol period) on the horizontal axis, and when the allocation of the data bursts to all subchannels for one symbol period is completed, the UL/DL data bursts are sequentially allocated again in units of subchannels for the next symbol period.

In FIG. 1, data bursts #1, #2 and #3 are data bursts allocated in a particular symbol period #n. For example, the BS allocates a subchannel #0 through a subchannel #5 for the data burst #1, and after completion of the subchannel allocation, allocates a subchannel #6 through a subchannel #8 for the next data burst #2. Thereafter, the BS allocates a subchannel #9 through a subchannel #10 for the next data burst #3, completing the subchannel allocation for the symbol period #n.

After completion of allocating the subchannels for the data bursts in the symbol period #n, the BS sequentially occupies again subchannels for data bursts #4 and #5 in the next symbol period #(n+1), completing the subchannel allocation for the symbol period #(n+1). Such a data burst allocation method is called "1-dimensional data burst allocation."

If a particular BS and its adjacent BS use the same subchannel band, the particular BS may receive an interference signal from the adjacent BS, causing a loss of data bursts. The data burst loss leads to a reduction in data transmission efficiency.

In order to solve this problem, a 2-dimensional burst allocation (shown by bold lines in FIG. 2) method has been proposed. However, there is no proposed scheme for supporting various operation modes and Modulation and Coding Schemes (MCSs) between a BS and an MS. For example, because the BS uses an error-robust MCS for all MAP messages, it must use the error-robust MCS even for the MAP message for an MS in a good channel state, causing a reduction in transmission efficiency.

SUMMARY OF THE INVENTION

It is, therefore, an object of the present invention to provide a MAP message transmission method capable of performing efficient burst allocation using H-ARQ support burst allocation in a BWA communication system, and a message structure therefor.

It is another object of the present invention to provide a MAP message transmission method and system for performing H-ARQ support burst allocation supporting various operation modes in a BWA communication system, and a message structure therefor.

It is further another object of the present invention to provide a method for increasing transmission efficiency by using sub-MAP messages having a different MCS according to a listening environment of an MS in a BWA communication system.

According to one aspect of the present invention, there is provided a method for transmitting a MAP message in a wireless communication system. The method includes transmitting, by a base station (BS), the MAP message including operation mode information indicating a data burst allocation scheme, to a mobile station (MS); and identifying, by the MS, a data burst according to the operation mode information.

According to another aspect of the present invention, there is provided a method for indicating data burst allocation by a base station (BS) in a wireless communication system. The method includes allocating a data burst to a particular region in a frame, determined by a symbol period axis and a frequency band axis, using a selected one of various modulation and coding schemes (MCSs); and transmitting a message including operation mode information indicating the selected MCS, to a mobile station (MS).

According to further another aspect of the present invention, there is provided a wireless communication system for transmitting a MAP message. The system includes a mobile station (MS), and a base station (BS). The BS transmits the MAP message including operation mode information indicating a data burst allocation scheme, to the MS, and the MS identifies a data burst according to the operation mode information.

According to yet another aspect of the present invention, there is provided a wireless communication system for indicating data burst allocation. The system includes a base station (BS) for allocating a data burst to a particular region in a frame, determined by a symbol period axis and a frequency band axis, using a selected one of various modulation and coding schemes, and transmitting a message including operation mode information indicating the selected MCS, to a mobile station (MS).

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides new MAP messages capable of supporting various operation modes between a base station (BS) and a mobile station (MS) in a wireless communication system supporting a Hybrid Automatic Repeat reQuest (H-ARQ) scheme, and performing efficient data burst allocation according to operation mode. The MAP message includes a subburst information element (IE) for each of the individual operation modes, and there are MAP messages mapped to the subburst IEs.

That is, after allocating data bursts to a particular region of a frame, determined by a symbol period axis and a frequency band axis, using one of various Modulation and Coding Schemes (MCSs), the BS transmits a message including operation mode information indicating the MCS used, to an MS. Upon receiving the message, the MS restores the data bursts using an MCS corresponding to the MCS used by the BS.

Although an embodiment of the present invention will be described herein with reference to the H-ARQ-related messages, it should be noted that the present invention is not limited to the H-ARQ scheme. In other words, even MSs not supporting H-ARQ can receive the messages provided in the present invention, and can be allocated data bursts depending on information included in the messages.

Figure 1:
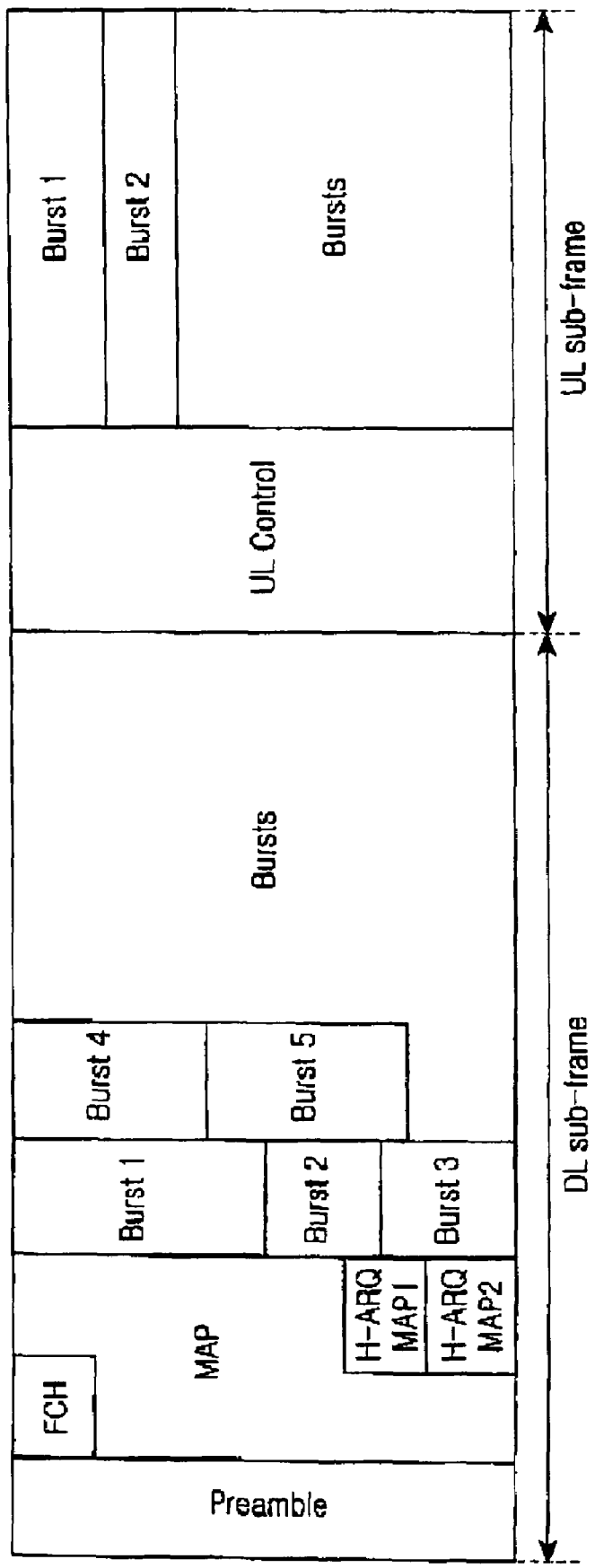
FIG. 1 is a diagram illustrating a data burst allocation scheme in a conventional wireless communication system.
Figure 2:
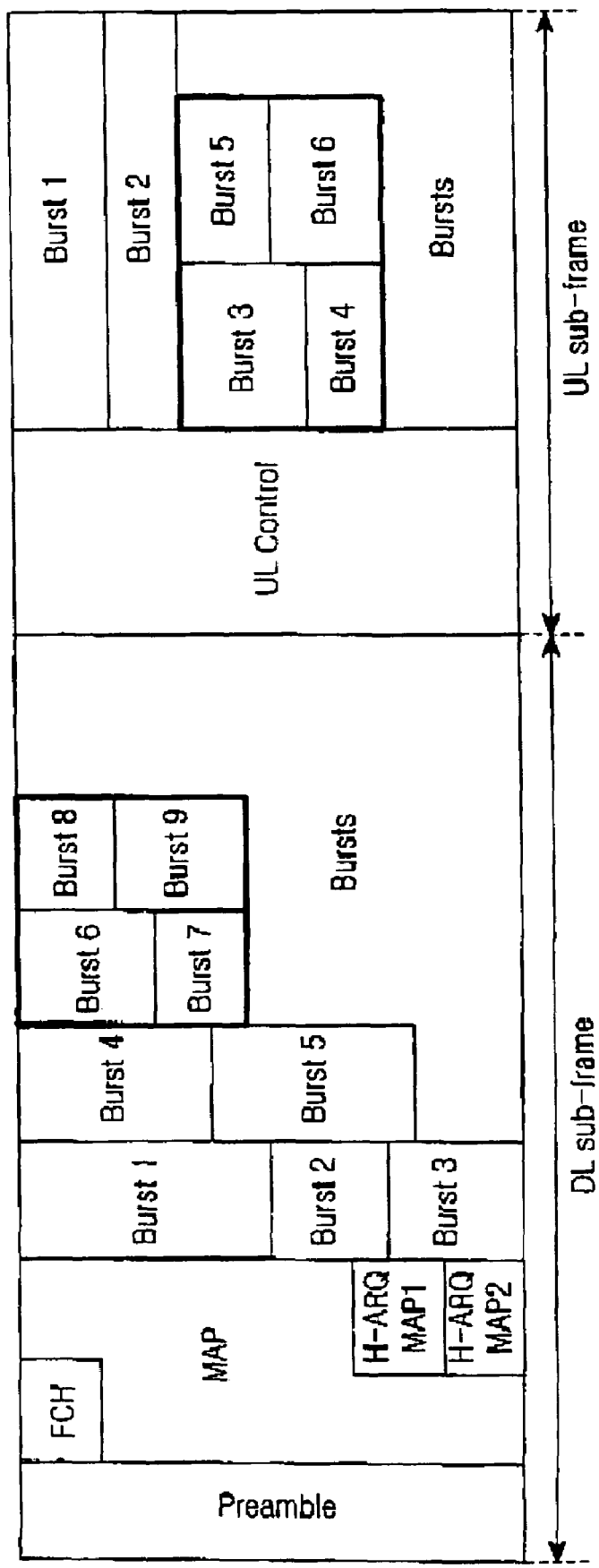
FIG. 2 is a diagram illustrating a description of a data burst allocation scheme of two dimensions.
Figure 3:
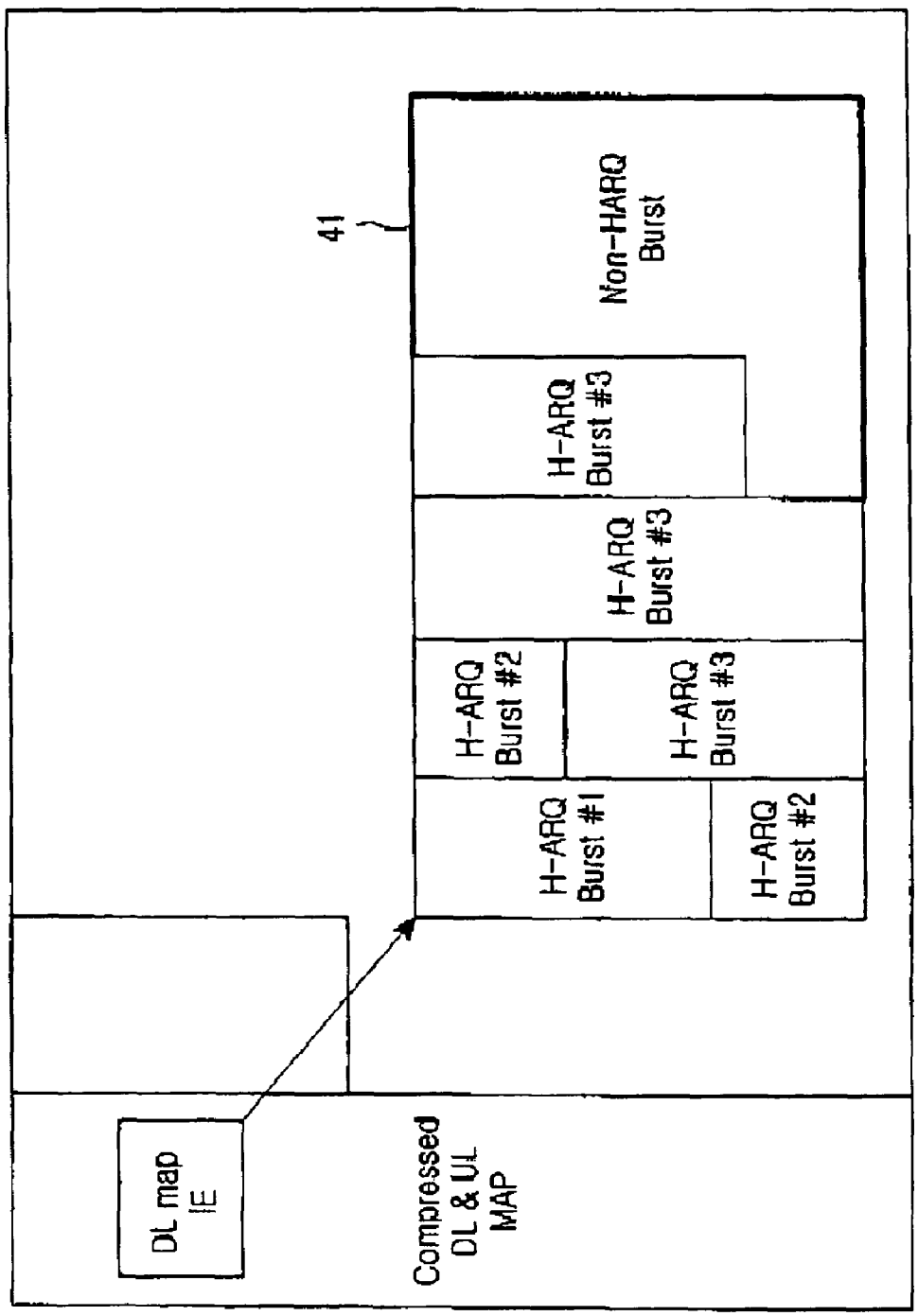
FIG. 3 is a diagram illustrating a structure of a MAP message according to an embodiment of the present invention.

FIG. 3 is a diagram illustrating a structure of a MAP message according to the present invention.

Referring to FIG. 3, downlink (DL) H-ARQ data bursts according to an embodiment of the present invention are allocated to a 2-dimensional data burst region defined in an H-ARQ DL MAP IE message shown in Table 1 below. The 2-dimensional data burst region refers to a 2-dimensional data burst region designated by an OFDMA Symbol offset (or start symbol offset) field, a Subchannel offset (or start subchannel offset) field, a No. OFDMA Symbols field, and a No. Subchannels field for data bursts in the H-ARQ DL MAP IE message, unlike the 1-dimensional data burst allocation that sequentially allocates data bursts from a first subchannel of a first symbol period. In FIG. 3, a rectangular data burst region denoted by reference numeral 31 corresponds to the 2-dimensional data burst region. In the present invention, H-ARQ data bursts in the 2-dimensional data burst region 31 are sequentially allocated in order of symbol and subchannel. The H-ARQ DL MAP IE message includes a Mode field, and the Mode field indicates various subburst IEs according to its value, wherein the sub-burst is termed by allocating a specified number of slots to each burst in the 2-dimensional data burst region.

TABLE 1

| Syntax | Size | Note |
| --- | --- | --- |
| H-ARQ DL MAP IE { | | |
|   Extended DIUC | 6 bits | |
|   Length | 8 bits | |
|   RCID_Type | 2 bits | 00 = Normal CID |
| | | 01 = RCID11 |
| | | 10 = RCID7 |
| | | 11 = RCID3 |
|   While (data remains) { | | |
|     OFDMA Symbol offset | 8 bits | Offset from the start symbol of DL sub-frame |
|     Subchannel offset | 6 bits | |
|     Boosting | 3 bits | 000: normal (not boosted); 001: +6 dB; 010: −6 dB; 011: +9 dB; 100: +3 dB; 101: −3 dB; 110: −9 dB; 111: −12 dB; |
|     No. OFDMA Symbols | 7 bits | |
|     No. Subchannels | 6 bits | |
|     N sub burst | 3 bits | Number of sub-bursts in 2D region |
|     Mode | 2 bits | Indicates the mode of this IE Bit #1-: 0 = No H-ARQ, 1 = H-ARQ Bit #0: 0 = DIUC/Length, 1 = Nep/Nsch |
|     If(Mode==00) { | | |
|       DL DIUC Sub-Burst IE ( ) | variable | |
|     } else if(Mode==10) { | | |
|       DL H-ARQ CC Sub-Burst IE ( ) | variable | |
|     } else if(Mode==11) { | | |
|       DL H-ARQ IR Sub-Burst IE ( ) | variable | |
|     } | | |
|   } | | |
| } | | |

Table 1 shows a format of the H-ARQ DL MAP IE message. The H-ARQ DL MAP IE message includes a 6-bit Extended DIUC (Downlink Interval Usage Code) field, an 8-bit Length field, and a 2-bit RCID_Type field indicating a type of a Reduced CID (RCID), and includes a plurality of an 8-bit OFDMA Symbol offset field, a 6-bit Subchannel offset field, a 3-bit Boosting field, a 7-bit No. OFDMA Symbols field, a 6-bit No. Subchannels field, a 3-bit N subburst field indicating the number of 1-dimensionally allocated bursts in a 2-dimensional allocation region, a 2-bit Mode field indicating an operation mode, and a DL Sub-Burst IE field for each individual operation mode, used for referring to an operation mode according to a value of the Mode field. A first bit of the Mode field indicates use/nonuse of H-ARQ according to its value. For example, if the first bit of the Mode field is set to '0', it means the H-ARQ scheme is not used, and if the first bit of the Mode field is set to '1', it means the H-ARQ scheme is being used. If a second bit of the Mode field is set '0', it means that subbursts are allocated through a DIUC value, and if the second bit of the Mode field is set to '1', it means that subbursts are allocated through Nep and Nsch values, as defined below.

The operation mode can be divided into four types according to combination of the two bits of the Mode field. Describing each of the operation modes, a DL DIUC Sub-Burst IE field is a field associated with a mode for allocating data bursts through a DIUC without using H-ARQ, a DL H-ARQ CC Sub-burst IE field is a field associated with a mode for allocating data bursts through a DIUC using H-ARQ, and a DL H-ARQ IR Sub-Burst IE field is a field associated with a mode for allocating data bursts through Nep and Nsch fields using H-ARQ. The Nep field indicates the number of encoded packets, and the Nsch field indicates the number of allocated subchannels. An MCS can be defined according to combination of the Nep and Nsch fields.

Table 2 through Table 4 below show formats of DL Sub-Burst IEs for the 3 operation modes associated with a DL DIUC Sub-Burst IE, a DL H-ARQ CC (Chase Combining) Sub-Burst IE, and a DL H-ARQ IR (Incremental Redundancy) Sub-Burst IE, respectively.

TABLE 2

| DL DIUC Sub-Burst IE { | | |
|---|---|---|
| DIUC | 4 bits | |
| Repetition Coding Indication | 2 bits | 0b00—No repetition coding |
| | | 0b01—Repetition coding of 2 used |
| | | 0b10—Repetition coding of 4 used |
| | | 0b11—Repetition coding of 6 used |
| For (j=0; j<N_sub burst; j++){ | | |
| RCID_IE( ) | Variable | |
| Dedicated Control Indicator | 1 bit | |
| If (Dedicated Control Indicator==1) { | | |
| Dedicated Control IE ( ) | Variable | |
| } | | |
| } | | |
| } | | |

TABLE 3

| DL H-ARQ CC Sub-Burst IE { | | |
|---|---|---|
| DIUC | 4 bits | |
| Repetition Coding Indication | 2 bits | 0b00—No repetition coding |

TABLE 3-continued

| | | |
|---|---|---|
| | | 0b01—Repetition coding of 2 used |
| | | 0b10—Repetition coding of 4 used |
| | | 0b11—Repetition coding of 6 used |
| For (j=0; j<N_sub burst; j++){ | | |
| RCID_IE( ) | Variable | |
| Length | 10 bits | |
| ACID | 4 bits | |
| AI_SN | 1 bit | |
| Dedicated Control Indicator | 1 bit | |
| If (Dedicated Control Indicator==1) { | | |
| Dedicated Control IE ( ) | Variable | |
| } | | |
| } | | |
| } | | |

TABLE 4

| DL H-ARQ IR Sub-Burst IE { | |
|---|---|
| For (j=0; j<N_sub burst; j++){ | |
| RCID_IE( ) | Variable |
| Nep | 4 bits |
| Nsch | 4 bits |
| SPID | 2 bits |
| ACID | 4 bits |
| AI_SN | 1 bit |
| Dedicated Control Indicator | 1 bit |
| If (Dedicated Control Indicator==1) { | |
| Dedicated Control IE ( ) | Variable |
| } | |
| } | |
| } | |

In Table 2 and 3, a 2-bit Repetition Coding Indication field indicates a type of Repetition Coding, and in Table 2 through Table 4, a 1-bit Dedicated Control Indicator field indicates use/nonuse of a dedicated control IE. That is, whether to include a variable-size Dedicated Control IE is determined according to a value of the Dedicated Control Indicator field.

In the H-ARQ DL MAP IE message shown in Table 1, the Mode field='00' indicates the DL DIUC SUB-Burst IE message of Table 2, the Mode field='10' indicates the DL H-ARQ CC SUB-Burst IE message of Table 3, and the Mode field='11' indicates the DL H-ARQ IR SUB-Burst IE message of Table 4. The messages of Table 2 through Table 4 commonly include the Dedicated Control Indicator field, and determine whether to include a Dedicated Control IE field according to a value of the Dedicated Control Indicator field.

In the Dedicated Control IE message, a Dedicated DL Control IE associated with a downlink can be shown in Table 5. That is, the Dedicated DL Control IE message includes a 4-bit Length field, a 4-bit Control Header field for CQICH control information, a 6-bit Allocation Index field indicating an allocation index in the presence of the CQICH control information, a 2-bit Period field indicating its period, a 3-bit Frame offset field indicating a location of the frame, and a 4-bit Duration field indicating its duration. It should be noted that the Dedicated DL Control IE message is variable in length.

TABLE 5

| Syntax | Size | Note |
|---|---|---|
| Dedicated DL Control IE( ) { | | |
| Length | 4 bits | Length of following control information in Nibble. |

TABLE 5-continued

| Syntax | Size | Note |
|---|---|---|
| Control Header | 4 bits | Bit #0: CQICH Control Info |
|  |  | Bit #1-#3: Reserved |
| If(CQICH Control Info ==1) { |  |  |
|     Allocation Index | 6 bits |  |
|     Period | 2 bits |  |
|     Frame offset | 3 bits |  |
|     Duration | 4 bits |  |
|     } |  |  |
| } |  |  |

TABLE 6

| Syntax | Size | Note |
|---|---|---|
| H-ARQ UL MAP IE( ){ |  |  |
|   Extended DIUC | 6 bits |  |
|   Length | 8 bits |  |
|   RCID_Type | 2 bits | 00 = Normal CID |
|  |  | 01 = RCID11 |
|  |  | 10 = RCID7 |
|  |  | 11 = RCID3 |
|   while (data remains){ |  |  |
|     Allocation Start Indication | 1 bits | 0: No allocation start information |
|  |  | 1: Allocation start information follows |
|     If(Allocation Start Indication ==1) { |  |  |
|       OFDMA Symbol offset | 8 bits | This value indicates start Symbol offset of subsequent sub-bursts in this H-ARQ UL MAP IE. |
|       Subchannel offset | 6 bits | This value indicates start Subchannel offset of subsequent sub-bursts in this H-ARQ UL MAP IE. |
|     } |  |  |
|     Mode | 2 bits | Indicates the mode of each burst |
|  |  | Bit #1: 0 = No H-ARQ, 1 = H-ARQ |
|  |  | Bit #0: 0 = DIUC/Length, 1 = Nep/Nsch |
|     N Burst | 4 bits | This field indicates the number of bursts in this UL MAP IE |
|     For (i=0;i<N Sub-burst; i++){ |  |  |
|       RCID IE( ) | Variable |  |
|       Dedicated Control Indicator | 1 bit |  |
|       If(Dedicated Control Indicator ==1){ |  |  |
|         Dedicated Control IE ( ) | Variable |  |
|       } |  |  |
|       If(Mode ==00) { |  |  |
|         UL UIUC Sub-Burst IE ( ) |  |  |
|       } else if(Mode==10){ |  |  |
|         UL HARQ CC Sub-Burst IE ( ) |  |  |
|       }else if(Mode==11){ |  |  |
|         UL HARQ IR Sub-Burst IE ( ) |  |  |
|       } |  |  |
|     } |  |  |
|   } |  |  |
| } |  |  |

Table 6 above shows a format of a H-ARQ UL MAP IE message.

The H-ARQ UL MAP IE message includes a 1-bit Allocation Start Indication field, and this field indicates whether to include an OFDMA Symbol offset and a Subchannel offset for UL subbursts. For example, the Allocation Start Indication field='1' indicates that an 8-bit OFDMA Symbol offset field and a 6-bit Subchannel offset field are included.

In addition, the H-ARQ UL MAP IE message includes a plurality of fields included in the H-ARQ DL MAP IE message. For example, the H-ARQ UL MAP IE message includes the RCID_Type field and the Mode field include in the H-ARQ DL MAP IE message.

In Table 6, Mode field='00' indicates a UL UIUC Sub-Burst IE, Mode field='10' indicates a UL H-ARQ CC Sub-Burst IE, and Mode field='11' indicates a UL H-ARQ IR Sub-Burst IE. The H-ARQ IR indicates an additional-information retransmission technique, and the H-ARQ CC indicates a same-information retransmission technique. The UL Sub-Burst IEs are delivered through UL Sub-MAP messages connected to a UL MAP message.

Table 7 through Table 9 below show formats of UL Sub-Burst IEs for the 3 operation modes associated with a UL UIUC Sub-Burst IE, a UL H-ARQ CC Sub-Burst IE, and a UL H-ARQ IR Sub-Burst IE, respectively. The UL Sub-Burst IE messages are similar in their fields to the DL Sub-Burst IE messages, so a detailed description thereof will be omitted.

TABLE 7

| | | |
|---|---|---|
| UL UIUC Sub-Burst IE{ | | |
| UIUC | 4 bits | |
| Repetition Coding Indication | 2 bits | 0b00—No repetition coding |
| | | 0b01—Repetition coding of 2 used |
| | | 0b10—Repetition coding of 4 used |
| | | 0b11—Repetition coding of 6 used |
| Duration | 10 bits | |
| } | | |

TABLE 8

| | | |
|---|---|---|
| HARQ CC UL Sub-Burst IE { | | |
| UIUC | 4 bits | |
| Repetition Coding Indication | 2 bits | 0b00—No repetition coding |
| | | 0b01—Repetition coding of 2 used |
| | | 0b10—Repetition coding of 4 used |
| | | 0b11—Repetition coding of 6 used |
| Duration | 10 bits | |
| ACID | 4 bits | |
| AI_SN | 1 bit | |
| } | | |

TABLE 9

| | |
|---|---|
| HARQ IR UL Sub-Burst IE { | |
| Nep | 4 bits |
| Nsch | 4 bits |
| SPID | 2 bits |
| ACID | 4 bits |
| AI_SN | 1 bit |
| } | |

The Dedicated UL Control IE, as shown in Table 10 below, includes a 4-bit Length field and a 4-bit Control Header field for CQICH control information. The Dedicated UL Control IE has additional control information for each subburst, and is variable in length because a type of the control information may be different for each subburst according to capability of an MS.

TABLE 10

| Syntax | Size | Note |
|---|---|---|
| Dedicated UL Control IE( ) { | | |
| Length | 4 bits | Length of following control information in Nibble. |

TABLE 10-continued

| Syntax | Size | Note |
|---|---|---|
| Control Header | 4 bits | Bit #-#3: Reserved |
| } | | |

Table 11 and Table 12 below show formats of H-ARQ DL/UL MAP IE messages associated with Multiple Input Multiple Output (MIMO), respectively. The H-ARQ MIMO DL/UL MAP IE messages are equal in their fields to the H-ARQ DL/UL MAP IE messages described above, so a description thereof will not be given.

TABLE 11

| Syntax | Size | Note |
|---|---|---|
| H-ARQ MIMO DL MAP IE { | | |
| Extended DIUC | 6 bits | |
| Length | 8 bits | |
| RCID_Type | 2 bits | 00 = Normal CID |
| | | 01 = RCID11 |
| | | 10 = RCID7 |
| | | 11 = RCID3 |
| While(data remains){ | | |
| OFDMA Symbol offset | 8 bits | Offset from the start symbol of DL sub-frame |
| Subchannel offset | 6 bits | |
| Boosting | 3 bits | 000: normal (not boosted); 001: +6 dB; 010: −6 dB; 011: +9 dB; 100: +3 dB; 101: −3 dB; 110: −9 dB; 111: −12 dB; |
| No. OFDMA Symbols | 7 bits | |
| No. subchannels | 6 bits | |
| N sub burst | 3 bits | Number of sub-bursts in 2D region |
| Mode | 2 bits | Indicates the mode of this IE Bit #1 : 0 = No H-ARQ, 1 = H-ARQ Bit #0: 0 = DIUC/Length, 1 = Nep/Nsch |
| If(Mode==00){ | | |
| MIMO DL DIUC Sub-Burst IE ( ) | variable | |
| }else if (Mode==01){ | | |
| MIMO DL Nep Sub-Burst IE ( ) | variable | |
| }else if (Mode==10){ | | |
| MIMO DL H-ARQ CC Sub-Burst IE ( ) | variable | |
| }else if (Mode==11){ | | |
| MIMO DL H-ARQ IR Sub-Burst IE ( ) | variable | |
| } | | |
| } | | |
| } | | |

TABLE 12

| Syntax | Size | Note |
|---|---|---|
| H-ARQ MIMO UL MAP IE( ){ | | |
| Extended DIUC | 6 bits | |
| Length | 8 bits | |
| RCID_Type | 2 bits | 00 = Normal CID |
| | | 01 = RCID11 |
| | | 10 = RCID7 |
| | | 11 = RCID3 |
| while (data remains) { | | |
| Allocation Start Indication | 1 bits | 0: No allocation start information |
| | | 1: Allocation start information |

TABLE 12-continued

| Syntax | Size | Note |
|---|---|---|
| | | follows |
| If(Allocation Start Indication ==1) | | |
| { | | |
|     OFDMA Symbol offset | 8 bits | This value indicates start Symbol offset of subsequent sub-bursts in this H-ARQ UL MAP IE. |
|     Subchannel offset | 6 bits | This value indicates start Subchannel offset of subsequent sub-bursts in this H-ARQ UL MAP IE. |
| } | | |
| Mode | 2 bits | Indicates the mode of each burst Bit #1 : 0 = No H-ARQ, 1 = H-ARQ Bit #0: 0 = DIUC/Length, 1 = Nep/Nsch |
| N Burst | 4 bits | This field indicates the number of bursts in this UL MAP IE |
| For (i=0; i<N__-Sub-burst; i++){ | | |
|   RCID IE( ) | Variable | |
|   Dedicated Control Indicator | 1 bit | |
|   If(Dedicated Control Indicator ==1) { | | |
|     Dedicated Control IE ( ) | Variable | |
|     } | | |
|   if(Mode ==00) { | | |
|     MIMO UL UIUC Sub-Burst IE ( ) | | |
|   } else if(Mode==01){ | | |
|     MIMO UL Nep Sub-Burst IE ( ) | | |
| }else if(Mode==10) { | | |
|     MIMO UL HARQ CC Sub-Burst IE ( ) | | |
|   }else if(Mode==11) { | | |
|     MIMO UL HARQ IR Sub-Burst IE ( ) | | |
|   } | | |
| } | | |
| } | | |
| } | | |

Like the H-ARQ DL/UL MAP IE message, the H-ARQ MIMO DL/UL MAP IE message has 4 operation modes, and is similar in field configuration to the H-ARQ DL/UL MAP IE message. Table 13, Table 14, Table 15 and Table 15 below formats of a MIMO DL DIUC Sub-burst IE, a MIMO DL Nep Sub-burst IE, a MIMO DL H-ARQ CC Sub-burst IE, and a MIMO DL H-ARQ IR Sub-burst IE, respectively.

TABLE 13

| MIMO DL DIUC Sub-Burst IE { | |
|---|---|
|   For(j=0; j<N__sub burst; j++){ | |
|     RCID_IE ( ) | Variable |
|     Length | 10 bits |
|     Dedicated Control Indicator | 1 bit |
|     If(Dedicated Control Indicator ==1) { | |
|       Dedicated Control IE ( ) | Variable |
|     } | |
|     For (i=0; i<N__layer; i++) { | |
|       DIUC | 4 bits |
|     } | |
|   } | |
| } | |

TABLE 14

| MIMO DL Nep Sub-Burst IE { | |
|---|---|
|   For (j=-; j<N__sub burst; j++){ | |

TABLE 14-continued

|     RCID_IE( ) | variable |
|---|---|
|     Nsch | 4 bits |
|     Dedicated MIMO DL Control Indicator | 1 bit |
|     If (Dedicated MIMO DL Control IE==1) { | |
|       Dedicated MIMO DL Control IE( ) | variable |
|     } | |
|     For (i=0; i<N__layer; i++) { | |
|       Nep | 4 bits |
|     } | |
|   } | |
| } | |

TABLE 15

| MIMO DL H-ARQ CC Sub-Burst IE { | |
|---|---|
|   For (j=-;j<N__sub burst;j++){ | |
|     RCID_IE( ) | variable |
|     Length | 10 bit |
|     Dedicated MIMO DL Control Indicator | 1 bit |
|     If (Dedicated MIMO DL Control Indicator==1) { | |
|       Dedicated MIMO DL Control IE( ) | variable |
|     } | |
|     For (i=0; i<N__layer; i++) { | |
|       DIUC | 4 bits |

TABLE 15-continued

| | |
|---|---|
| ACID | 4 bits |
| AI_SN | 1 bit |
| } | |
| } | |
| } | |

TABLE 16

| | |
|---|---|
| MIMO DL H-ARQ IR Sub-Burst IE { | |
| For (j=0; j<N_sub burst; j++){ | |
| RCID_IE( ) | variable |
| Nsch | 4 bits |
| SPID | 2 bits |
| ACID | 4 bits |
| AI_SN | 1 bit |
| Dedicated MIMO DL Control Indicator | 1 bit |
| If (Dedicated MIMO DL Control Indicator==1) { | |
| Dedicated MIMO DL Control IE( ) | variable |
| } | |
| For (i=0; i<N_layer; i++) { | |
| Nep | 4 bits |
| } | |
| } | |
| } | |

In Table 13 through Table 16, for Dedicated Control Indicator field='1', a Dedicated MIMO DL Control IE is included in the corresponding Sub-Burst IEs.

Table 17 below shows a format of a Dedicated MIMO DL Control IE message. The Dedicated MIMO DL Control IE message includes a 4-bit Length field and a 4-bit Control Header field indicating control information, and if a bitmap value of the Control Header field indicates CQICH Control Info, i.e., if CQICH Control Info value is set to '1', the Dedicated MIMO DL Control IE message further includes a 6-bit Allocation Index field, a 2-bit Period field, a 3-bit Frame offset field, a 4-bit Duration field, and a 3-bit Feedback type field indicating a type of feedback on a CQICH.

If a value of the Control Header field indicates MIMO Control Info, i.e., if a MIMO Control Info value is set to '1', the Dedicated MIMO DL Control IE message includes a 2-bit Matrix field indicating a transmission matrix and a 2-bit Num layer field indicating the number of coding/modulation layers. The Dedicated MIMO DL Control IE message includes a 3-bit Antenna Grouping Index field, a 3-bit Antenna Selection Index field, and a 6-bit Codebook Precoding Index field according to type of a MIMO mode.

TABLE 17

| Syntax | Size | Note |
|---|---|---|
| Dedicated MIMO DL Control IE( ) { | | |
| Length | 4 bits | Length of following control information in Nibble. |
| Control Header | 4 bits | Bit #0: CQICH Control Info<br>Bit #1: MIMO Control Info<br>Bit #2-#3: Reserved |
| If(CQICH Control Info ==1){ | | |
| Allocation Index | 6 bits | |
| Period | 2 bits | |
| Frame offset | 3 bits | |
| Duration | 4 bits | |
| Feedback type | 3 bits | Type of feedback on this CQICH<br>See 8.4.5.4.15 |
| } | | |
| if(MIMO Control Info ==1){ | | |
| Matrix | 2 bits | Indicates transmission matrix (See 8.4.8)<br>00 = Matrix A (Transmit diversity)<br>01 = Matrix B (Hybrid Scheme)<br>10 = Matrix C (Spatial Multiplexing)<br>11 = Reserved |
| Num layer | 2 bits | Number of coding/modulation layers<br>00 = 1 layer<br>01 = 2 layers<br>10 = 3 layers<br>11 = 4 layers |
| if(MIMO Control Info ==01){ | | MIMO mode in the preceding STC_Zone_IE( ) |
| Antenna Grouping Index } | 3 bits | Indicates the index of antenna grouping<br>See 8.4.8.3.4 and 8.4.8.3.5 |
| else if(MIMO mode ==10){ | | |
| Antenna Selection Index } | 3 bits | Indicates the index of antenna selection<br>See 8.4.8.3.4 and 8.4.8.3.5 |
| else if(MIMO MODE == 11){ | | |
| Codebook Precoding Index } | 6 bits | Indicates the index of precoding matrix W in the codebook<br>See 8.4.8.3.6 |
| } | | |
| } | | |

Table 18, Table 19, Table 20 and Table 21 below show formats of a MIMO UL UIUC Sub-burst IE, a MIMO UL Nep Sub-burst IE, a MIMO UL H-ARQ CC Sub-burst IE, and a MIMO UL H-ARQ IR Sub-burst IE, respectively.

TABLE 18

| MIMO UL UIUC Sub-Burst IE{ | |
|---|---|
| Duration | 10 bits |
| For(i=0; i<N_layer; i++){ | |
| UIUC | 4 bits |
| } | |
| } | |

TABLE 19

| MIMO UL Nep Sub-Burst IE{ | |
|---|---|
| Nsch | 4 bits |
| For(i=0; i<N_layer; i++){ | |
| Nep | 4 bits |
| } | |
| } | |

TABLE 20

| MIMO UL HARQ CC Sub-Burst IE{ | |
|---|---|
| Duration | 10 bits |
| For(i=0; i<N_layer; i++){ | |
| UIUC | 4 bits |
| ACID | 4 bits |
| AI_SN | 1 bit |
| } | |
| } | |

TABLE 21

| MIMO UL HARQ IR Sub-Burst IE{ | |
|---|---|
| Nsch | 4 bits |
| SPID | 2 bits |
| ACID | 4 bits |
| AI_SN | 1 bit |
| For(i=0; i<N_layer; i++){ | |
| Nep | 4 bits |
| } | |
| } | |

Table 22 below shows a format of a Dedicated MIMO UL Control IE message.

TABLE 22

| Syntax | Size | Note |
|---|---|---|
| Dedicated MIMO UL Control IE( ) | | |
| { | | |
| Length | 4 bits | Length of following control information in Nibble. |
| Control Header | 4 bits | Bit #0: MIMO Control Info |
| | | Bit #1-#3: Reserved |
| if(MIMO Control Info == 1){ | | |
| Matrix | 1 bit | Indicates transmission matrix (See 8.4.8) |
| | | 0 = Matrix A (Transmit Diversity) |
| | | 1 = Matrix C (Spatial Multiplexing) |
| Num layer | 1 bit | Number of coding/modulation layers |
| | | 0 = 1 layer |
| | | 1 = 2 layers |
| } | | |
| } | | |

IEs of Table 22 include a 4-bit Length field and a 4-bit Control Header field indicating control information, and if a value of the Control Header field indicates MIMO Control Info, a 1-bit Matrix field indicating a transmission scheme and a 1-bit Num layer field indicating the number of coding/modulation layers are included in the Dedicated MIMO UL Control IE.

Figure 4:
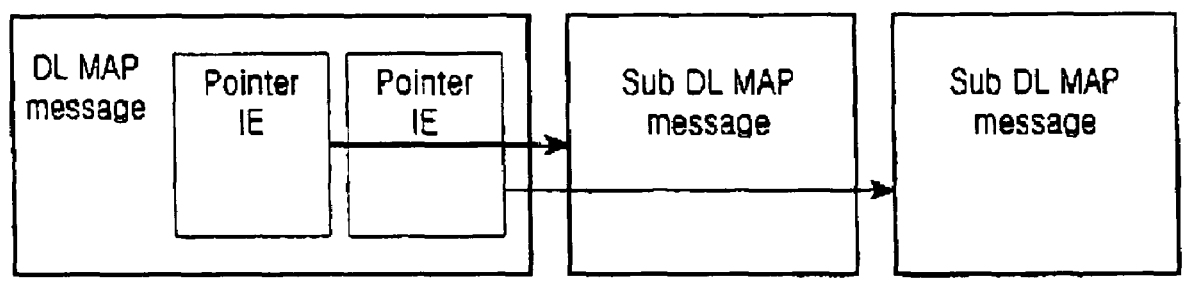
FIG. 4 is a diagram illustrating exemplary application of a Sub DL MAP message according to an embodiment of the present invention.

FIG. 4 is a diagram illustrating exemplary application of a Sub DL MAP message according the present invention. According to the present invention, the message is transmitted in a region different from a MAP message region in a frame, and is a message generated such that each MS can set a different MCS. The Sub Map message may use a Pointer IE in a DL MAP message or a UL MAP message.

Figure 5:
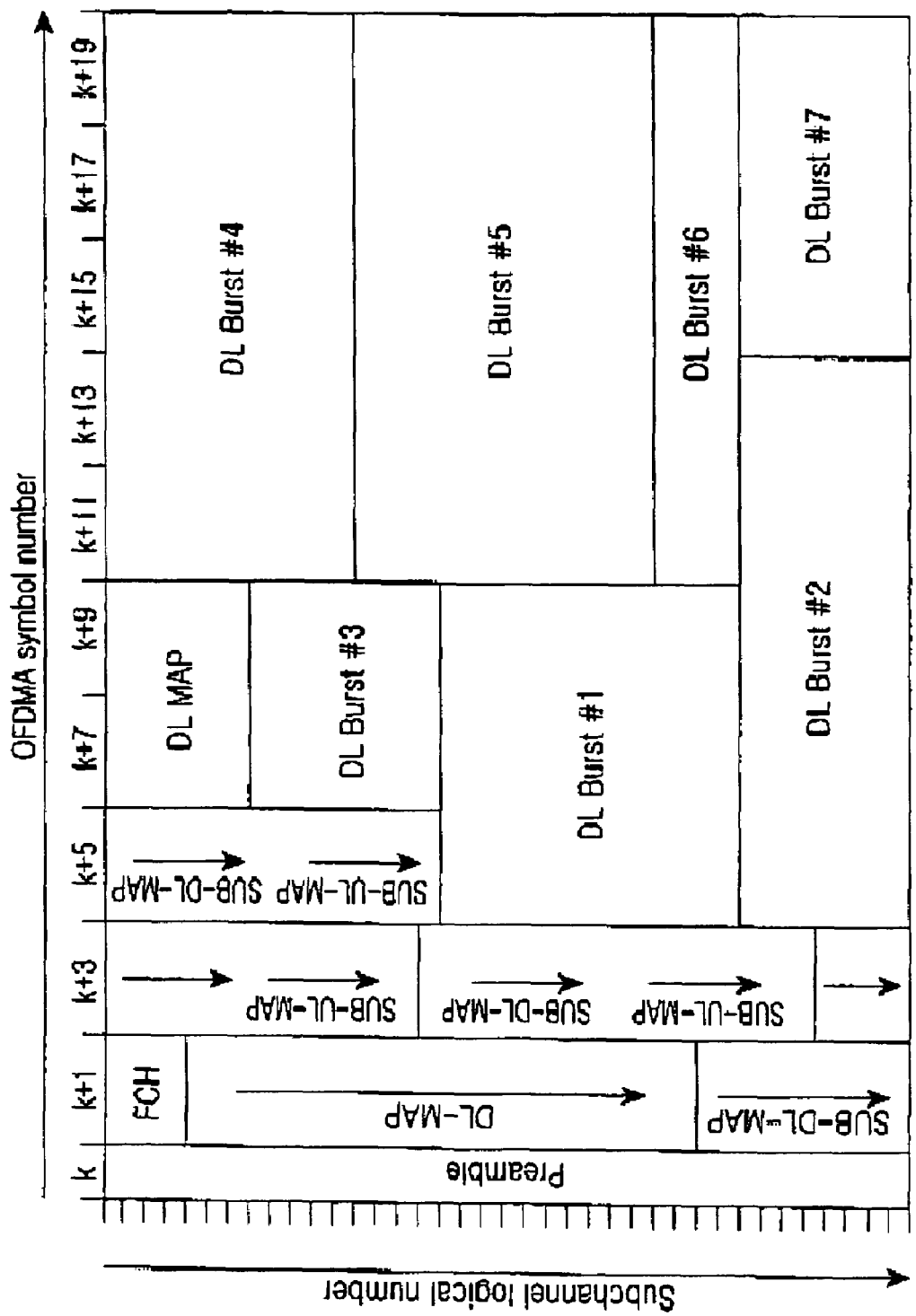
FIG. 5 is a diagram illustrating exemplary arrangement of Sub MAP messages in an OFDMA frame according to an embodiment of the present invention.

FIG. 5 is a diagram illustrating an exemplary arrangement of Sub MAP messages in an OFDMA frame according to the present invention.

Table 23 below shows a format of a SUB-DL-UL-MAP message of the present invention. The message includes a 2-bit Compressed MAP indicator field indicating availability of a compressed MAP, a 10-bit MAP message length field indicating a message length, an 8-bit DL IE Count field indicating the number of DL IEs, DL and UL MAP IE fields, the number of which is equal to the number of the IEs, and an 11-bit Slot offset field.

TABLE 23

| Syntax | Size | Notes |
|---|---|---|
| SUB-DL-UL-MAP ( ) { | | |
| Compressed map indicator | 2 bits | Set to binary 11 for compressed format |
| Map message length | 10 bits | |
| DL IE Count | 8 bits | |
| For(i=1; i<=DL IE Count; i++) | | |
| DL-MAP_IE( ) | Variable | |
| } | | |
| Slot offset | 11 bits | |
| while (map data remains){ | | |
| UL-MAP_IE( ) | Variable | |
| } | | |
| If(byte boundary){ | | |
| Padding Nibble | Variable | Padding to reach byte boundary. |
| } | | |
| } | | |

The SUB-DL-UL-MAP message is indicated by an H-ARQ and Sub-MAP Pointer IE message shown in Table 24 below. Referring to Table 24, the Sub-MAP Pointer IE is similar to the conventional H-ARQ MAP Pointer IE, but it further includes a 2-bit MAP Version field for adding a sub MAP message to the IE, a 1-bit CID mask include field indicating inclusion of a CID mask, and a 15-bit CID mask field which is included when the CID mask include field is set to '1'.

Because each MS has a CID to receive a service, a BS has information on a CID of its every MS. In the conventional method, the MS should receive and decode all Sub MAP messages even though the contents of the Sub MAP messages are unnecessary for the MS itself, probably leading to a waste of power and processing. In order to address this problem, an embodiment of the present invention can deliver Sub MAP message information only to the MS that requires the corresponding Sub MAP message, using a CID mask.

For example, when the Sub MAP message includes a MAP IE for an MS and a quotient obtained by dividing a basic CID of the MS by 15 equals 3, a third value under the CID mask is set to '1'. That is, the MS checks a CID mask through a modulo operation to determine whether to decode the Sub MAP indicated by Table 24 below.

As shown in Table 24, the H-ARQ and Sub-MAP Pointer IE message includes a 2-bit MAP Version field, and the MAP Version field includes a Sub-MAP=0b01 indicating an H-ARQ MAP version.

A BS transmits a ZONE_IE message for using a particular subchannel. The ZONE_IE message according to the present invention can be defined as shown in Table 25. The ZONE_IE message includes a 4-bit Extended UIUC field, a 4-bit Length field, a 7-bit OFDMA Symbol offset field, a 2-bit Permutation field indicating a type of subchannel permutation used, a 7-bit PUSC UL_IDcell bit, and a 1-bit Include Slot offset field indicating presence/absence of a slot offset. If the Include Slot offset field is set to '1', 11-bit slot offset information is included in the field.

TABLE 24

| Syntax | Size | Note |
| --- | --- | --- |
| H-ARQ and Sub-MAP Pointer IE( ) { | | |
|   Extended DIUC | 4 bits | H-ARQ MAP Pointer = 0x07 |
|   Length = 2 × N | 4 bits | N is the number of H-ARQ MAP or Sub MAP bursts |
|   While (data remains) { | | |
|     DIUC | 4 bits | |
|     No. Slots | 8 bits | |
|     Repetition Coding Indication | 2 bits | 0b00 = No repetition coding<br>0b01 = Repetition coding of 2 used<br>0b10 = Repetition coding of 4 used<br>0b11 = Repetition coding of 6 used |
|     MAP Version | 2 bits | 0b00 = H-ARQ MAP v1<br>0b01 = Sub-MAP |
|     CID mask include | 1 bit | 0 = no CID mask included<br>1 = CID mask included |
|     If (CID mask included) { | | |
|       CID mask | 15 bits | When the MAP message pointed by this pointer IE includes any MAP IE for an MS, the ((Basic CID of the MS)) mod 15)-th LSB of CID mask shall be set to 1. Otherwise, it shall be set to 0. |
|     } | | |
|   } | | |
| } | | |

TABLE 25

| Syntax | Size | Notes |
|---|---|---|
| ZONE_IE( ) { | | |
|     Extended UIUC | 4 bits | ZONE = 0x04 |
|     Length | 4 bits | variable |
|     OFDMA symbol offset | 7 bits | |
|     Include Slot offset | 1 bit | |
|     if (Include Slot offset == 1) | | |
| { | | |
|     Slot offset | 11 bits | The slot offset (according to data slot mapping order), relative to the start of the zone, from which to begin allocating data slots to subsequent allocations. Slot offset is implicitly set to zero if 'Include slot offset' = 0. |
|     Reserved | 5 bits | |
| } | | |
| Else { | | |
|     Reserved | 7 bits | |
| } | | |
| Permutation | 2 bits | 0b00 = PUSC permutation<br>0b01 = FUSC permutation<br>0b10 = Optional FUSC permutation<br>0b11 = Adjacent subcarrier permutation |
| PUSC UL_IDcell | 7 bits | |
|     } | | |
| } | | |

As can be understood from the foregoing description, the present invention provides H-ARQ MAP messages that include a plurality of MAP IEs and support various operation modes in a BWA communication system, making it possible to efficiently allocate data bursts to an MS.

In addition, a BS provides an MS with messages that can apply an MCS according to a channel state of the MS, thereby increasing transmission efficiency and performing efficient resource management according to an operation mode between the BS and the MS.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a downlink MAP message by a Base Station (BS) in a wireless communication system, the method comprising the steps of:
    transmitting, to at least one Mobile Station (MS), the downlink MAP message including information on a two-dimensional data burst region, a mode information on a sub-burst Information Element (IE), and the sub-burst IE including information on sub-bursts,
    wherein the two-dimensional data burst region is partitioned into the sub-bursts by allocating a specified number of slots to each of the sub-bursts, and designated by a number of Orthogonal Frequency Division Multiple Access (OFDMA) symbols and a number of subchannels,
    wherein each of the slots is defined by a predetermined number of subchannels and OFDMA symbols, the mode information indicates a mode for the sub-burst IE, the mode is one of a plurality of modes, and the information on the sub-bursts indicates a region of each of the sub-bursts, and
    wherein the slots are allocated in a frequency-first order starting from a slot with the smallest symbol number and the smallest subchannel with an increasing subchannel number within the two-dimensional data burst region.

2. The method of claim 1, wherein the sub-burst IE includes, for each of the sub-bursts, information on a Reduced Connection IDentifier (RCID) IE, a dedicated control indicator, and a dedicated control IE,
    wherein the RCID IE indicates an RCID for a corresponding sub-burst, the dedicated control indicator indicates whether the dedicated control IE is included, and the dedicated control IE includes duration information.

3. The method of claim 1, wherein the plurality of modes include a chase combining Hybrid Automatic Repeat reQuest (HARQ) mode and an incremental redundancy HARQ mode.

4. The method of claim 1, wherein the sub-burst IE includes, for each of the sub-bursts, information on a Downlink Interval Usage Code (DIUC) for a corresponding sub-burst.

5. The method of claim 1, wherein the downlink MAP message includes an OFDMA symbol offset, a subchannel offset, the number of OFDMA symbols, and the number of subchannels,
    wherein the two-dimensional data burst region is represented by the OFDMA symbol offset, the subchannel offset, the number of OFDMA symbols, and the number of subchannels.

6. A wireless communication system, comprising:
    at least one Mobile Station (MS); and
    a Base Station (BS),
    wherein the BS is adapted to transmits, to the at least one MS, a down-link MAP message including information on a two-dimensional data burst region, a mode information on a sub-burst Information Element (IE), and the sub-burst IE including information on sub-bursts,
    wherein the two-dimensional data burst region is partitioned into the sub-bursts by allocating a specified number of slots to each of the sub-bursts, and is designated by a number of Orthogonal Frequency Division Multiple Access (OFDMA) symbols and a number of subchannels, wherein each of the slots is defined by a predetermined number of subchannels and OFDMA symbols, the mode information indicates a mode for the sub-burst IE, the mode is one of a plurality of modes, and the information on the sub-bursts indicates a region of each of the sub-bursts, and wherein the slots are allocated in a frequency-first order starting from a slot with the smallest symbol number and the smallest subchannel with an increasing subchannel number within the two-dimensional data burst region.

7. The wireless communication system of claim 6, wherein the sub-burst IE includes, for each of the sub-bursts, information on a Reduced Connection IDentifier (RCID) IE, a dedicated control indicator, and a dedicated control IE, wherein the RCID IE indicates an RCID for a corresponding sub-burst, the dedicated control indicator indicates whether the dedicated control IE is included, and the dedicated control IE includes duration information.

8. The wireless communication system of claim 6, wherein the plurality of modes include a chase combining Hybrid Automatic RepeatreQuest (HARQ) mode and an incremental redundancy HARQ mode.

9. The wireless communication system of claim 6, wherein the sub-burst IE includes, for each of the sub-bursts, information on a Downlink Interval Usage Code (DIUC) for a corresponding sub-burst.

10. The wireless communication system of claim 6, wherein the downlink MAP message includes an OFDMA symbol offset, a subchannel offset, the number of OFDMA symbols, and the number of subchannels, wherein the two-dimensional data burst region is represented by the OFDMA symbol offset, the subchannel offset, the number of OFDMA symbols, and the number of subchannels.

11. A method for receiving a downlink MAP message by a Mobile Station (MS) in a wireless communication system, the method comprising the steps of:

receiving, from a Base Station (BS), the down-link MAP message including information on a two-dimensional data burst region, mode information on a sub-burst Information Element (IE), and the sub-burst IE including information on sub-bursts, wherein the two-dimensional data burst region is partitioned into the sub-bursts by allocating a specified number of slots to each of the sub-bursts, and is designated by a number of Orthogonal Frequency Division Multiple Access (OFDMA) symbols and a number of subchannels, wherein each of the slots is defined by a predetermined number of subchannels and OFDMA symbols, the mode information indicates a mode for the sub-burst IE, the mode is one of a plurality of modes, and the information on the sub-bursts indicates a region of each of the sub-bursts, and wherein the slots are allocated in a frequency-first order starting from a slot with the smallest symbol number and the smallest subchannel with an increasing subchannel number within the two-dimensional data burst region.

12. The method of claim 11, wherein the sub-burst IE includes, for each of the sub-bursts, information on a Reduced Connection IDentifier (RCID) IE, a dedicated control indicator, and a dedicated control IE, wherein the RCID IE indicates an RCID for a corresponding sub-burst, the dedicated control indicator indicates whether the dedicated control IE is included, and the dedicated control IE includes duration information.

13. The method of claim 11, wherein the plurality of modes include a chase combining Hybrid Automatic Repeat reQuest (HARQ) mode and an incremental redundancy HARQ mode.

14. The method of claim 11, wherein the sub-burst IE includes, for each of the sub-bursts, information on a Downlink Interval Usage Code (DIUC) for a corresponding sub-burst.

15. The method of claim 11, wherein the downlink MAP message includes an OFDMA symbol offset, a subchannel offset, the number of OFDMA symbols, and the number of subchannels, wherein the two-dimensional data burst region is represented by the OFDMA symbol offset, the subchannel offset, the number of OFDMA symbols, and the number of subchannels.

16. A wireless communication system, comprising:

a Base Station (BS) and a Mobile Station (MS), wherein the MS is adapted to receive, from the BS, a down-link MAP message including information on a two-dimensional data burst region, mode information on a sub-burst Information Element (IE), and the sub-burst IE including information on sub-bursts, wherein the two-dimensional data burst region is partitioned into the sub-bursts by allocating a specified number of slots to each of the sub-bursts, and is designated by a number of Orthogonal Frequency Division Multiple Access (OFDMA) symbols and a number of subchannels, wherein each of the slots is defined by a predetermined number of subchannels and OFDMA symbols, the mode information indicates a mode for the sub-burst IE, the mode is one of a plurality of modes, and the information on the sub-bursts indicates a region of each of the sub-bursts, and wherein the slots are allocated in a frequency-first order starting from a slot with the smallest symbol number and the smallest subchannel with an increasing subchannel number within the two-dimensional data burst region.

17. The wireless communication system of claim 16, wherein the sub-burst IE includes, for each of the sub-bursts, information on a Reduced Connection IDentifier (RCID) IE, a dedicated control indicator, and a dedicated control IE, wherein the RCID IE indicates an RCID for a corresponding sub-burst, the dedicated control indicator indicates whether the dedicated control IE is included, and the dedicated control IE includes duration information.

18. The wireless communication system of claim 16, wherein the plurality of modes include a chase combining Hybrid Automatic Repeat reQuest (HARQ) mode and an incremental redundancy HARQ mode.

19. The wireless communication system of claim 16, wherein the sub-burst IE includes, for each of the sub-bursts, information on a Downlink Interval Usage Code (DIUC) for a corresponding sub-burst.

20. The wireless communication system of claim 16, wherein the downlink MAP message includes an OFDMA symbol offset, a subchannel offset, the number of OFDMA symbols, and the number of subchannels, wherein the two-dimensional data burst region is represented by the OFDMA symbol offset, the subchannel offset, the number of OFDMA symbols, and the number of subchannels.

* * * * *